United States Patent Office 2,920,081
Patented Jan. 5, 1960

2,920,081

PRODUCTION OF 2,5-DIALKOXY-TETRA-HYDROFURAN

Walter R. Privette, Charleston, and Helmut W. Schulz, Nitro, W. Va., and Donald M. Young, Geneva, Switzerland, assignors to Union Carbide Corporation, a corporation of New York No Drawing. Application May 8, 1957
Serial No. 657,725

6 Claims. (Cl. 260—347.8)

This invention relates to a novel process for preparing 2,5-dialkoxytetrahydrofuran and to a method for preparing succinaldehyde by means of this novel process.

The Oxo reaction by means of which unsaturated, oxygenated compounds such as alcohols, acids, esters, and aldehydes may be hydroformylated to bifunctional molecules would be expected to provide an easy route from acrolein to succinaldehyde according to the general equation:

$$CH_2\text{=}CHCHO + CO + H_2 \xrightarrow{catalyst} CHO(CH_2)_2CHO$$

However, attempts to produce succinaldehyde by this process have been generally unsuccessful. Acrolein undergoes addition and condensation reactions to the exclusion of hydroformylation by the Oxo reaction.

It would appear that if the acrolein carbonyl group were masked, hydroformylation of the double bond by the Oxo reaction might be possible. Such was found to be the case. The double bond of allylidene diacylate has been hydroformylated almost quantitatively by the Oxo reaction according to the general equation:

$$(RCOO)_2CHCH\text{=}CH_2 + CO + H_2 \xrightarrow{catalyst}$$
$$(RCOO)_2CHCH_2CH_2CHO$$

wherein "R" is an alkyl group, and preferably a lower alkyl group containing from 1 to 8 carbon atoms.

However, the 4,4-diacyloxybutyraldehyde so produced could not be isolated efficiently from the reaction mixture. Attempts to hydrolyze the diacyloxybutyraldehyde to succinaldehyde followed by recovery of succinaldehyde by distillation resulted in excessive polymerization of the kettle product.

One reaction that has been found to provide a good yield of succinaldehyde is the acid hydrolysis of 2,5-dialkoxytetrahydrofuran which proceeds according to the general equation:

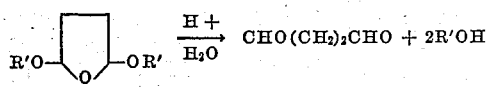
$$\xrightarrow[H_2O]{H+} CHO(CH_2)_2CHO + 2R'OH$$

wherein "R'" is an alkyl group, and preferably a lower alkyl group containing from 1 to 8 carbon atoms. Further, the dialkoxytetrahydrofuran may be stored for a considerable period of time without the danger of polymerization. When succinaldehyde is needed, the relatively easy acid hydrolysis of 2,5-dialkoxytetrahydrofuran provides a ready source.

However, the preparation of dialkoxytetrahydrofuran is a difficult and costly process. If it could be prepared from 4,4-diacyloxybutyraldehyde there would be, in addition to a new source of dialkoxytetrahydrofuran, a new process for preparing succinaldehyde wherein the Oxo reaction might be advantageously employed.

It is an object of this invention to provide a process for the preparation of 2,5-dialkoxytetrahydrofuran from 4,4-diacyloxybutyraldehyde.

It is another object to provide a process for preparing succinaldehyde from 4,4-diacyloxybutyraldehyde.

Still other objects are to provide processes for producing 2,5-dialkoxytetrahydrofuran and/or succinaldehyde from acrolein and/or acrolein diacylate.

Other objects will be apparent from the disclosure.

The achievement of the objects results from the discovery that the catalyzed alcoholysis of 4,4-diacyloxybutyraldehyde yields 2,5-dialkoxytetrahydrofuran.

When 4,4-diacyloxybutyraldehyde is treated with an alcohol in the presence of an appropriate catalyst, acetalization and cyclization occur according to the over-all equation:

$$(RCOO)_2CHCH_2CH_2CHO + 4R'OH \xrightarrow{catalyst}$$

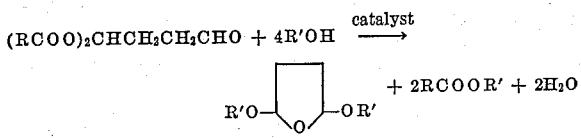
$$+ 2RCOOR' + 2H_2O$$

wherein "R" and "R'" are alkyl groups, and preferably lower alkyl groups containing from 1 to 8 carbon atoms.

The process is catalyzed by any of the standard acetalizing catalysts, e.g., strong acids such as phosphoric acid, sulfuric acid, trichloroacetic acid, benzenesulfonic acid, toluenesulfonic acid, and metal halides such as ferric chloride and zinc chloride.

Of these catalysts, sulfuric acid has been found to provide the highest yield of dialkoxytetrahydrofuran.

Dialkoxytetrahydrofuran may be prepared by mixing 4,4-diacyloxybutyraldehyde, alcohol and catalyst in an appropriate container and allowing the mixture to reach equilibrium. However, in practice, better yields are obtained by removing some of the reaction products. For example, the ester and/or water may be distilled from the reaction mixture thereby upsetting the equilibrium in favor of the formation of more dialkoxytetrahydrofuran.

As was indicated previously, 4,4-diacyloxybutyraldehyde may be produced by the Oxo reaction. Since this aldehyde is not easily isolated, the preparation of 2,5-dialkoxytetrahydrofuran by the novel process of this invention is most easily begun by preparing the aldehyde by the Oxo reaction from allylidene diacylate or from acrolein which is first converted to allylidene diacylate.

Acrolein may be converted to allylidene diacylate by reacting it with an acid anhydride. Allylidene diacylate is reacted with carbon monoxide and hydrogen in the presence of a cobalt catalyst such as a Fischer-Tropsch catalyst or cobalt carbonyl. The carbon monoxide and hydrogen are maintained at a volume ratio of from about 1:1 to about 1:2 in the reaction mixture at a pressure of at least 2000 p.s.i.g.; higher pressures are recommended. The temperature should be maintained in the range of about 100° C. to 250° C., preferably in the range of 130° C. to 135° C. It has been found that the use of inert diluents such as saturated ethers, aromatic and saturated aliphatic hydrocarbons in about 25 percent concentration increases the efficiency of reaction. Conversions (based on allylidene diacetate) and efficiencies (based on diacetoxybutyraldehyde) greater than 90 percent have been obtained by this procedure. The inert diluent may be removed from the reaction product by any suitable means, such as distillation, and the alcohol and catalyst for acetalization and cyclization added directly to the residue.

If an acidic catalyst is employed in the acetalization and cyclization step, it should be neutralized prior to isolation or concentration of the dialkoxytetrahydrofuran. Any salt of a weak acid and strong base, for example, the acetates, carbonates, phosphates, oxalates, borates, etc., of the alkali and alkaline earth metals, are satisfactory for this purpose. The liquid may then be distilled from the neutralized reaction mixture to effect the separation of the product from the salts of neutralization. The distillate may then be concentrated by fractional distillation if concentrated dialkoxytetrahydrofuran is desired. An alternative method is to fractionally distill the dialkoxytetrahydrofuran directly from the neutralized mixture. Water, ester, alcohol, or mixtures thereof, may be separated from the neutralized product prior to distillation or evaporation of the dialkoxytetrahydrofuran by distillation of these as azeotropes if such separation is necessary.

The refined 2,5-dialkoxytetrahydrofuran may be stored for uses at a later time or may be hydrolyzed in the presence of an acid to succinaldehyde. The alcohol produced by such hydrolysis is distilled from the mixture. The residue may be neutralized and filtered to provide an aqueous solution of succinaldehyde.

The invention will be more clearly understood by the following examples for the preparation of succinaldehyde from allylidene diacetate.

Example 1

To 600 grams of allylidene diacetate and 600 grams of toluene containing 0.62 percent cobalt carbonyl (based on total charge) was added an equimolar carbon monoxide-hydrogen mixture until the pressure in the reaction vessel was 3000 p.s.i.g. The mixture was heated to 130° C. at which temperature the pressure had increased to 4200 p.s.i.g. At the end of 4.75 hours, the pressure had decreased to 1800 p.s.i.g. The reaction mixture weighed 1306 grams. Toluene was distilled at 60 mm. pressure from 1225 grams of the reaction mixture. To the 780 grams of residue were added 3065 grams of ethanol containing 10 grams of sulfuric acid. An ethanol-ethyl acetate fraction weighing 2290 grams was removed by fractional distillation; the 1555 grams of residue were neutralized with 23 grams of calcium acetate and then filtered. Distillation from the filtrate of ethanol left 1193 grams of residue, 756 grams of which were fractionally distilled to yield a fraction weighing 319 grams and boiling in the range of 54° to 56° C. at 4 mm.; it contained 91 percent acetal as diethoxytetrahydrofuran. This represents a yield of 78.5 percent acetal based on allylidene diacetate. This product was again fractionally distilled to give a fraction containing 95 percent 2,5-diethoxytetrahydrofuran and 2.3 percent succinaldehyde. Hydrolysis of this fraction at 59° C. in the presence of 0.1 percent sulfuric acid produced a mixture from which ethanol was distilled at 100 mm. Hg pressure. A 100 percent yield was obtained in the hydrolysis step. The aqueous residues were neutralized with calcium acetate, treated with activated carbon, and filtered. The filtrate contained 28.9 percent succinaldehyde. Other properties of the filtrate were: color, 45° Pt—Co; specific gravity 20/20–1.079.

Example 2

In this example, 880 grams of a crude allylidene diacetate hydroformylation product containing 66 percent 4,4-diacetoxybutyraldehyde and 27 percent benzene were reacted with 1480 grams of methanol and 3.5 grams of sulfuric acid. The methyl acetate formed during alcoholysis and cyclization was removed as a methanol-methyl acetate azeotrope by distillation. When no more methyl acetate appeared in the distillate, the residue was neutralized with 15 grams of sodium acetate and distilled under reduced pressure without rectification. The 487 grams of distillate contained 29.0 percent dimethoxytetrahydrofuran, 12.5 percent succinaldehyde, 20.2 percent methanol, and 35.4 percent water. This represents 34.5 percent yield of 2,5-dimethoxytetrahydrofuran and 22.8 percent yield of succinaldehyde. This distillate was concentrated by distillation to 34.5 percent as available succinaldehyde; 50 grams of the concentrate were added to 50 grams of water and sufficient hydrogen chloride to acidify the mixture. Methanol was removed by distillation to give 80 grams of an aqueous solution containing 20 percent succinaldehyde. This represents a 93 percent yield in the hydrolysis step; a higher yield might have been obtained by a more complete removal of the methanol and water.

Example 3

In an example of this invention on a larger scale, 13,901 pounds of allylidene diacetate were hydroformylated in a continuous flow Oxo conversion system to give 17,821 pounds of a crude containing 74.9 percent diacetoxybutyraldehyde, 19.6 percent hexyl ether and toluene, 3.4 percent allylidene diacetate and 2.0 percent mineral acid. The crude was reacted with 32,000 pounds of anhydrous ethanol in the presence of 123 pounds sulfuric acid; ethyl acetate and ethanol were distilled from the reaction mixture. The residue was neutralized with 170 pounds of calcium carbonate. Fractional distillation of the neutralized residue yielded a fraction containing 93 percent 2,5-diethoxyltetrahydrofuran and 3 percent succinaldehyde. This fraction had the additional physical properties: specific gravity 20/20=0.969; color, 50 Pt—Co; index of refraction 20/D=1.4199.

A 7.9 pound aliquot was hydrolyzed by refluxing it with 11.2 pounds of water containing 0.019 pound of concentrated sulfuric acid. Ethanol was removed from the mixture by distillation. The residue was treated with 0.5 pound of activated carbon, heated to 45° C., cooled and filtered. The 16.4 pounds of filtrate contained 28.9 percent succinaldehyde, 1.7 percent diethoxytetrahydrofuran and 68.7 percent water. It had a specific gravity 20/20 of 1.079 and a color of 45° Pt—Co.

The preparation of diethoxytetrahydrofuran from allylidene diacetate has one advantage over the preparation of dimethoxytetrahydrofuran from the diacetate. Ethanol, ethyl acetate and water form a ternary azeotrope; all three of these are present in the reaction mixture during the acetalization and cyclization reaction. Thus the water of reaction is easily removed from the mixture by distillation. Further, the ternary azeotrope is heterogeneous below 20° C. thereby producing an easy separation and recovery of the azeotrope components. Methanol, methyl acetate, and water do not form a heterogeneous ternary azeotrope so that the water is not removed from the reaction mixture as it is formed.

Thus, in the preferred form of the invention, the allylidene diacylate and the alcohol are selected so that the reactant alcohol, and the ester and water produced by the reaction form a ternary heterogeneous azeotrope.

As may be seen from the examples, not only does the process of the invention provide a means for preparing 2,5-dialkoxytetrahydrofuran, but also an entirely new means for synthesizing succinaldehyde starting with allylidene diacylate.

What is claimed is:

1. A process for the preparation of a substituted tetrahydrofuran which comprises reacting 4,4-diacyloxybutyraldehyde of the formula $(RCOO)_2CHCH_2CH_2CHO$ wherein R is an alkyl group containing 1 to 8 carbon atoms and a lower alkyl alcohol in the presence of a strong acid catalyst and thereafter recovering 2,5-dialkoxytetrahydrofuran.

2. The process of claim 1 wherein the alcohol is selected from the group consisting of methanol and ethanol.

3. The process of claim 1 wherein the catalyst is sulfuric acid.

4. A process for the preparation of a substituted tetrahydrofuran which comprises reacting a lower alkyl alcohol and 4,4-diacetoxybutyraldehyde in the presence of a strong acid catalyst and thereafter recovering 2,5-dialkoxytetrahydrofuran.

5. The process of claim 4 wherein the alcohol is selected from the group consisting of methanol and ethanol.

6. The process of claim 5 wherein the catalyst is sulfuric acid.

References Cited in the file of this patent

UNITED STATES PATENTS

| | | |
|---|---|---|
| 2,286,884 | Westphal | June 16, 1942 |
| 2,682,546 | Copelin | June 29, 1954 |
| 2,750,418 | Clauson-Kaas | June 12, 1956 |
| 2,779,192 | Isler | Jan. 29, 1957 |

OTHER REFERENCES

Adkins et al.: J.A.C.S., vol. 71, pp. 3051–55 (1949).
Helferich: Berichte, vol. 52, pp. 1123–31 (1919).